US00RE38581E1

(19) United States
(12) Reissued Patent
Doniguian

(10) Patent Number: US RE38,581 E
(45) Date of Reissued Patent: Sep. 14, 2004

(54) PULSED CATHODIC PROTECTION SYSTEM AND METHOD

(76) Inventor: Thaddeus M. Doniguian, 913 Emerald Bay, Laguna Beach, CA (US) 92651

(21) Appl. No.: 10/157,571

(22) Filed: May 29, 2002

Related U.S. Patent Documents

Reissue of:
(64) Patent No.: 6,224,742
Issued: May 1, 2001
Appl. No.: 09/493,830
Filed: Jan. 28, 2000

(51) Int. Cl.[7] ..... C23F 13/00
(52) U.S. Cl. ..... 205/724; 205/728; 205/729; 205/734; 205/740; 204/196.03; 204/196.09; 204/196.11; 204/196.21; 204/196.34; 204/196.36; 204/196.37
(58) Field of Search ..... 205/724, 728, 205/729, 734, 740; 204/196.03, 196.09, 196.11, 196.21, 196.34, 196.36, 196.37

(56) References Cited

U.S. PATENT DOCUMENTS 3,612,898 A * 10/1971 Doniguian et al. ..... 205/729
3,692,650 A * 9/1972 Kipps et al. ..... 205/729
4,080,272 A * 3/1978 Ferry et al. ..... 205/726
4,752,368 A * 6/1988 Wasson ..... 205/724
4,767,512 A * 8/1988 Cowatch et al. ..... 205/729
5,139,634 A * 8/1992 Carpenter et al. ..... 205/727
5,324,405 A * 6/1994 Doniguian ..... 204/196.05
6,046,515 A * 4/2000 Lewis ..... 307/95

* cited by examiner

*Primary Examiner*—Bruce F. Bell
(74) *Attorney, Agent, or Firm*—Harold L. Jackson

(57) ABSTRACT

A cathodic protection system for protecting buried conducting structures, subject to corrosion such as well casings, pipe lines and the like, utilizes a plurality of pulsed D.C. current sources with the negative output terminal of each source connected to a separate structure and the positive output terminal of the sources connected to a common anode located near the structures. A control circuit synchronizes the operation of the several D.C. sources and sets the frequency and width of the output pulses. The amplitude of the output pulses from each D.C. source may be separately adjusted.

19 Claims, 5 Drawing Sheets

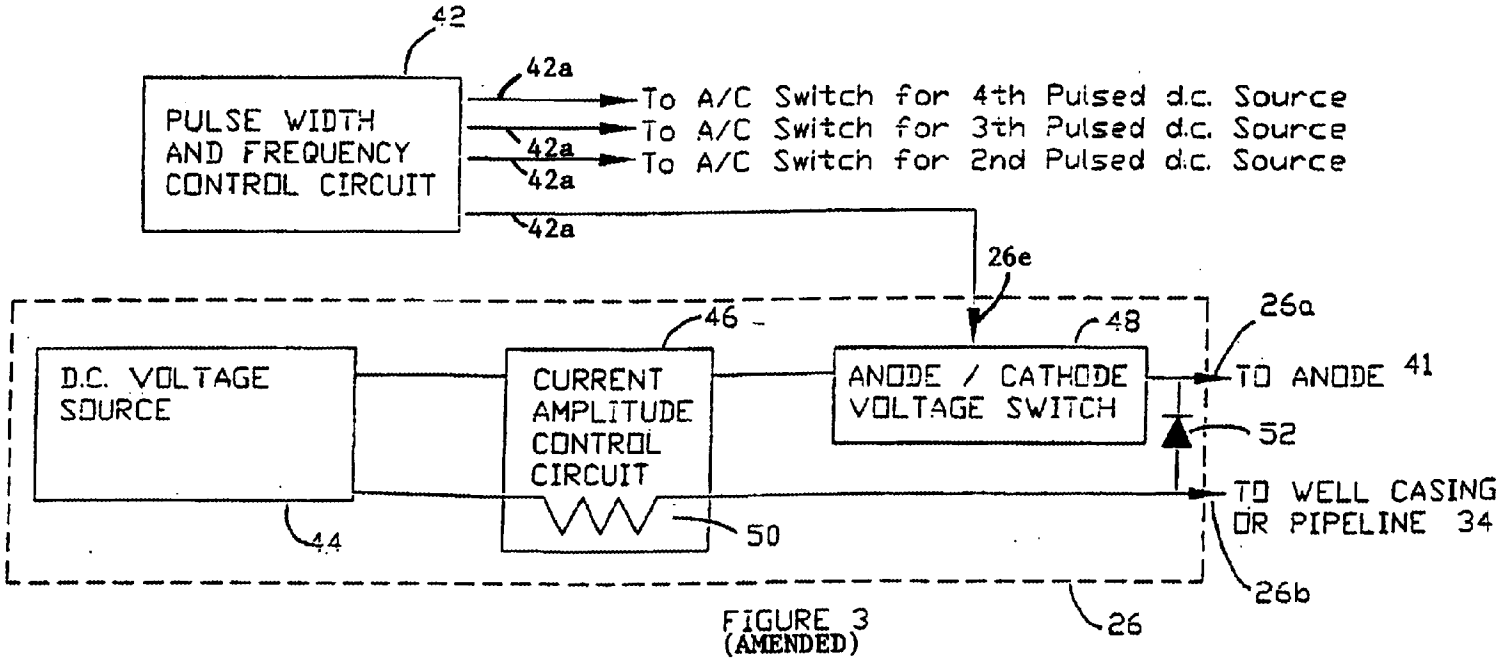
FIGURE 3 (AMENDED)

PULSED CATHODIC PROTECTION SYSTEM AND METHOD

Matter enclosed in heavy brackets [ ] appears in the original patent but forms no part of this reissue specification; matter printed in italics indicates the additions made by reissue.

BACKGROUND OF THE INVENTION

1. Field of the Invention

This invention relates to a system and method for the cathodic protection of structures such as pipelines and well casings disposed in an electrically conducting medium such as the ground and more particularly to such a system utilizing pulsed D.C. current to protect a plurality of such structures in which the spacing between the structures and/or different electrical properties of the conducting medium surrounding the structures are not amenable to the use of a single pulsed source.

2. Description of the Prior Art

The use of cathodic protection to prevent corrosion is well established for the protection of metal structures, such as well casings and pipe lines, that are buried in conductive soils. Cathodic protection is also used for the protection of inner surfaces of tanks which contain corrosive solutions, as well as for the protection of sub-platforms, and other offshore metal structures. It is well established that the cathodic protection can be accomplished either by the use of sacrificial anodes electrically grounded to the structure to be protected, or by the application of low voltage direct current from a power source. In the latter method steady direct current, half or full wave rectified current, and pulsed direct current have all been used.

It has been well established that, when a cathodic protection current is applied to a circuit including the structure (cathode) to be protected and its associated anode, a layer of charge is formed at approximately 100 A. from the surface of the structure. This layer of charge is called a taffel double layer. This layer acts as a capacitor in series with the anode-cathode circuit. In the absence of a cathodic protection system the soil or other conductive corrosive medium to which a ferrous metal structure such as a steel pipeline is exposed will cause an adverse chemical reaction in which ferrous or iron molecules pass into solution as positive ions by surrendering electrons to the structure. Hydrogen ions in the solution will accept the free electrons and form a gas, e.g. $H_2$, adjacent to the surface of the structure. Oxygen molecules and certain other substances, if present in the solution, will also accept the electrons. This action results in a loss of iron in the structure with a consequent degradation of structural integrity.

Direct current cathodic protection systems prevent (or inhibit) the iron molecules from passing into solution by providing an exterior source of free electrons to the structure. The electrons supplied by the cathodic protection systems reduce any oxygen molecules and/or hydrogen ions present at the surface of the structure. The iron molecules are inhibited from going into solution, because the hydrogen ion and oxygen molecule receptors for the iron molecule electrons have been reduced by the cathodic protection system electrons. As a general rule, the greater the amount of current (accumulated electrons per unit of time) that is supplied by the cathodic protection system, the greater will be the area of structure protected.

A typical steady state 15 volt and 15 ampere D.C. cathodic protection system offers good protection but provides only a limited umbrella of protection or throw along the structure such as a pipeline to be protected. Such steady state systems thus require a considerable number of protection stations for a given length of the structure or pipe to be protected. Increasing the amount of current supplied by increasing the voltage, will increase the throw. The average current must, however, be limited such that an excess of hydrogen gas is not generated at the point of application of the cathodic protection system. An excess of hydrogen may cause damage to protective coatings. Excess hydrogen will also permeate the pipe wall, causing certain pipe materials to crack or rupture.

It has been shown that a pulsed D.C. voltage source having an output of the order of 100–300 volts for 5–100 microseconds ("$\mu$s") with a duty cycle of the order of 10% provides a much greater coverage (or throw) per station e.g. one station every few miles of pipeline. Such pulsed systems have been considered to be particularly effective because, although the average current is still in the order of magnitude of 15 amperes, the peak current, which is flowing for a sufficient length of time to cause the protective reactions to take place, will be typically as high as 300 amperes. The pulsed D.C. systems also cause a greater redistribution of the current along the structure, such as a pipeline, because of the inductive and capacitive reactance of the anode and structure system.

Copper-copper sulfate electrodes are conventionally used to determine the effectiveness of cathodic protection systems in protecting well casings and pipelines. Such electrodes, comprising a copper rod immersed in a copper sulfate solution (typically a gel) are placed in the ground, adjacent the well casings or pipeline (e.g., 1 or 2 feet there from) and the potential between the metal structure and the copper rod is measured. A potential, typically called "the well head potential", of about 1 volt is considered to provide appropriate protection.

Prior art cathodic protection systems are disclosed in my prior U.S. Pat. Nos. 3,612,898; 3,692,650; and 5,324,405 ("'405 patent"). The '405 patent teaches an improvement over the systems disclosed in the earlier patents in terms of increasing the current distribution or throw of the current along a pipeline or well casing as well as increasing the protection of neighboring pipelines or well casings. This improvement is accomplished by the limiting current flow in the power supply through the use of back emf current limiting means. The disclosure of the '405 patent is incorporated herein by reference.

A typical prior art pulsed protection system is illustrated in FIG. 1 of the drawings where reference numerals 10, 12 and 14 designate a D.C. voltage source, an anode/cathode voltage switch and a pulse width/frequency control unit, respectively. The positive output is supplied to an anode unit 16 (which may comprise several discrete metal cylinders connected in parallel) via a positive terminal 18 and the negative output is supplied to a plurality of well casings or pipelines 20 and 22 via the negative terminal 24. A diode 25 (or a back emf limiter as taught in the '405 patent) is connected across the output terminals 18 and 24. The voltage and current waveforms V and I of the output, appearing across the terminals 18 and 24, are shown in FIG. 1 to the right of the switch 12. As is pointed out in the '405 patent the use of diode 25 protects the voltage source from reverse voltage spikes at the expense of somewhat limiting the current throw and the protection for neighboring structures where a single current source is used.

A problem has arisen when a single pulsed D.C. source is used to protect two or more structures from a single anode unit where the spacial distances between the structures and/or the electrical properties of the soil or other conducting medium result in one or more structures receiving excessive current while others receive inadequate current for protective purposes. The use of a separate anode unit and pulsed sources for each neighboring well casing or pipeline has its own set of problems as is alluded to in the '405 patent. An under protected well casing or pipeline located in adverse soil conditions may need frequent replacement. The cost of replacing a damaged well casing or section of pipeline can be very expensive. For example, the cost to replace a deep well casing may run as much or more than one million dollars. Thus, the problem has serious economic consequences.

There is a need for an improved cathodic protection system capable of adequately protecting multiple adjacent structures such as well casings and the like which are not amenable to the use of a single pulsed source.

SUMMARY OF THE INVENTION

A system for the effective cathodic protection of a plurality of spaced electrically conducting structures such as ferrous metal pipe lines or well casings exposed to an electrically conducting medium, such as the ground, in accordance with the present invention comprises a plurality of pulsed D.C. current sources with each source being adapted to be connected to a separate structure. Each current source is arranged to supply a current pulse of a controllable amplitude to the associated structure at a selected frequency. A control circuit is coupled to each current source and arranged to synchronize the operation of the current sources so that the current pulses of all current sources occupy substantially the same time frame during each cycle. In other words, each of the current pulses during a cycle is initiated at substantially the same time and the decay of each of the current pulses begins at the same time. The magnitude of the current from each of the current sources may be separately adjusted to provide the proper amount of current to each structure to ensure its protection. By the same token, the pulse width and cycle frequency of all the current sources may be adjusted as desired.

It is to be noted that it is the rise or rise time of the current pulses from the several pulsed D.C. current sources which is controlled to occur during the same time frame. The decay of the current pulses is dependant on the impedance of the load, i.e., the anode, cathode (or well casing, pipelines etc.) and the intervening conducting medium such as the soil. The term current rise or current rise time refers to the time frame in which the current pulse is initiated until the current pulse begins to decay. Thus, the terminology setting the pulse width of the current pulses means setting the current use time for such pulses.

The construction and operation of the present invention can best be understood by the following description taken in conjunction with the accompanying drawings in which like components are designated by like reference numerals.

BRIEF DESCRIPTION OF THE DRAWINGS

FIG. 3 is a block diagram of several components of a pulsed current source;

DESCRIPTION OF THE PREFERRED EMBODIMENT

Figure 1:
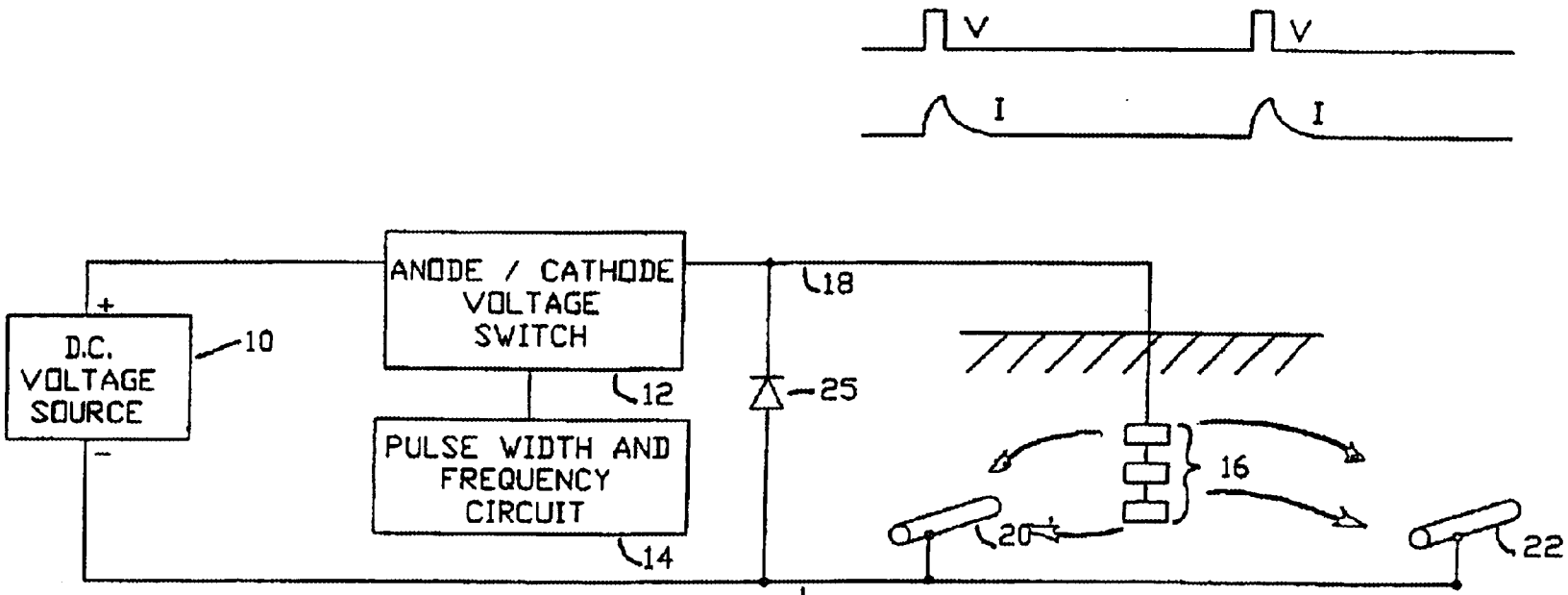
FIG. 1 is a block diagram of a state of the art pulsed cathodic protection system in which current pulses from a single source are applied between a single anode unit and two buried structures, such as well casings.
Figure 2:
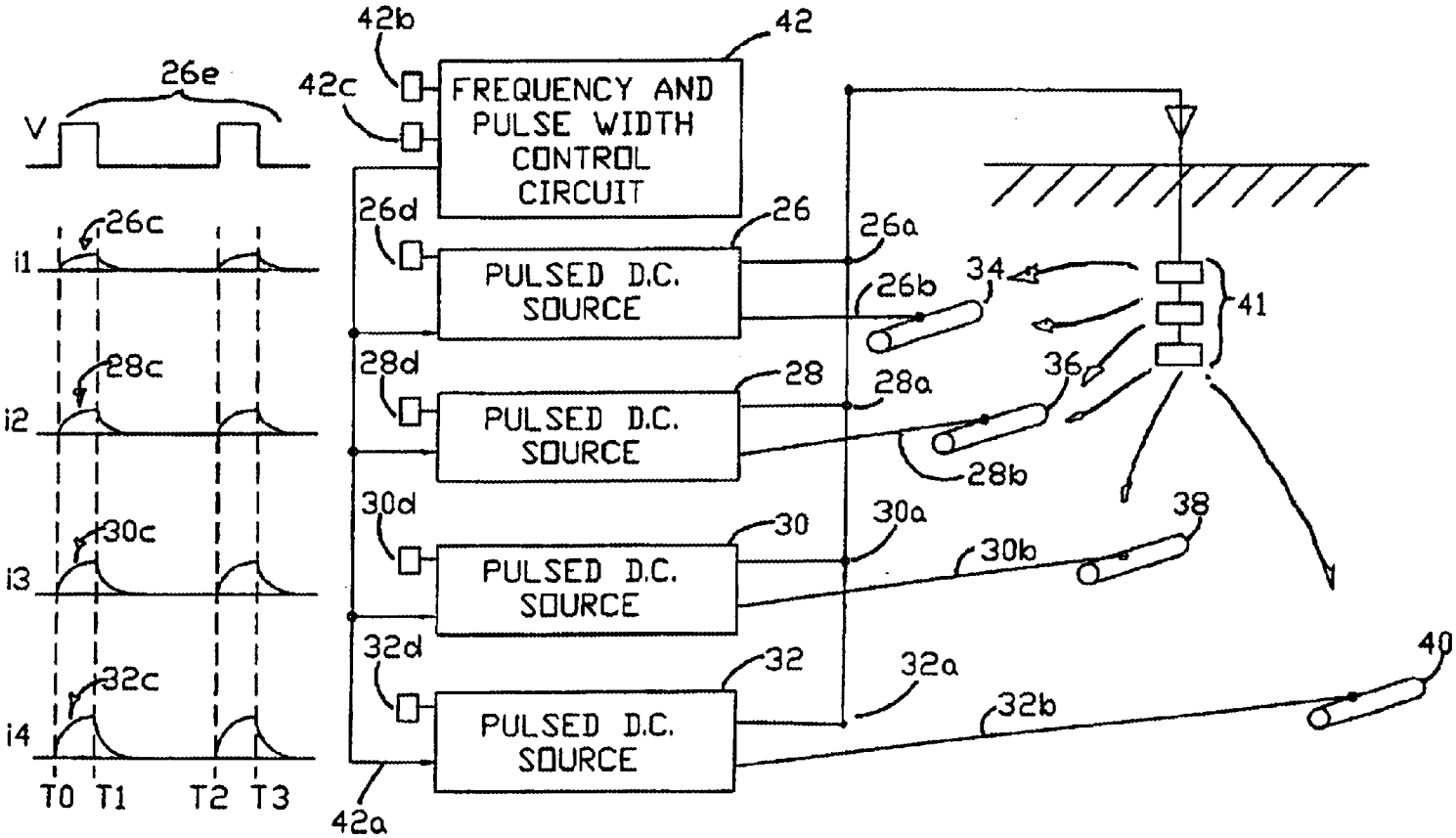
FIG. 2 is a block diagram of a cathodic protection system for protecting a plurality of structures, such as well casings or pipe lines, with the use of multiple pulsed D.C. sources, in accordance with the present invention.

Referring now to FIG. 2 a cathodic protection system, in accordance with the present invention, comprises a group of pulsed D.C. sources 26, 28, 30 and 32 with each source having a negative output terminal 26b, 28b, 30b and 32b arranged to be connected to a separate ferrous metal structure such as a well casing (or pipe line) 34, 36, 38 and 40 as illustrated.

The positive output terminals 26a, 28a, 30a, and 32a of the D.C. sources are connected to an anode unit, as shown, which is submersed in the same electrically conducting medium as the well casings, e.g., the ground. A frequency and pulse width control circuit 42 is connected to each of the pulsed D.C. sources to set the width of the voltage and current pulses as well as the frequency of such pulses produced across the output terminals.

The control circuit 42 may include manually controllable knobs 42b and 42c for setting the frequency and pulse width of the voltage and current output pulses from the pulsed sources. The waveform of the voltage across the output terminals of the D.C. source 26 is shown at 26e in the diagram in the left hand portion of FIG. 2 with the generally square wave output voltage pulses occurring during the same time frame during each cycle i.e., $t_o$ to $t_1$, $t_2$ to $t_3$ etc. The output voltage pulses from the other pulsed D.C. sources, although not shown, will also be in the form of square waves and occupy the same time frame during each cycle as the pulses from the source 26. The current pulses (i.e., rise times) supplied by the D.C. sources to the several well casings 34, 36, 38 and 40 and anode unit 41, which occupy the same time frame as the voltage pulses, are designated as $i_1$, $i_2$, $i_3$ and $i_4$, as illustrated. As pointed out previously, the time frame (or width) of the current pulses refers to the rise times of such pulses, i.e., the time from $t_o$ to $t_1$, $t_2$ to $t_3$ in the waveform diagram of FIG. 2.

As the impedance between the anode and the well casings increases, due to increased distance and/or more resistive soil conditions, greater current is required to provide the necessary protection. As is illustrated in the waveform diagram, by way of example, the magnitude of the current pulse supplied by the D.C. source 32 is greater than the magnitude of the output current pulse from the D.C. source 26. The amplitude or magnitude of the output current pulses from each D.C. source is adjustable. The D.C. sources may include manual control means such as knobs 26d, 28d, 30d, and 32d for adjusting the magnitude of the output current pulses. There are a myriad of well known and conventional ways to adjust the frequency, pulse width and magnitude of the output current pulses from the pulsed D.C. sources. If desired, such parameters could be controlled by a computer.

Once the system of FIG. 2 is installed in the field, well head potential measuring electrodes are typically positioned adjacent the well heads or pipelines which are connected to the pulsed D.C. sources. The desired pulse width and frequency of the output voltage and current pulses are set by the control circuit 42. The magnitudes of the output current pulses (typically the mean or average value of the output current) from the several D.C. sources are then adjusted until the proper protection of each well casing is achieved. It should be noted that an adjustment of the amplitude of the output current from one D.C. source may and probably will change the current flow from one or more of the other D.C. sources to their associated casings. Thus, it is often necessary to make several successive adjustments of the output current amplitude of the several D.C. sources. It should also be noted that it may be necessary to reset the pulse width and frequency during the adjustment period.

Referring now to FIG. 3 the basic components of a pulsed D.C. source suitable for use in the system are illustrated. A D.C. voltage source 44, which may be in the form of a rectified (and filtered) A.C. voltage, is connected to the input of a current amplitude control circuit 46. The output of the amplitude control circuit is supplied to the associated well casing or pipeline and the anode unit via an anode/cathode voltage switch 48. The pulse width and frequency control circuit 42 *supplies a common output signal on four output terminals collectively identified as 42a to input circuits such as input circuit 26e to control* [controls] the operation *of* the *associated* anode/cathode switch to set the frequency and width of the output pulses *from all of the current sources*. The amplitude of the output current, once set by an operator, is maintained substantially constant by means of a current sensing resistor unit 50 connected in a conventional feedback loop well known to those skilled in the art. It should be noted that the current sensing resistor 50 will typically include appropriate filtering to provide an output voltage thereacross which is representative of the mean or average current.

A diode 52 is connected across the output terminals for protecting the switch 48 from high inverse voltages. As is pointed out in the '405 patent, this diode may be replaced with a back emf limiter to increase the current throw at the expense of reverse voltage spikes, if desired.

Figure 4:
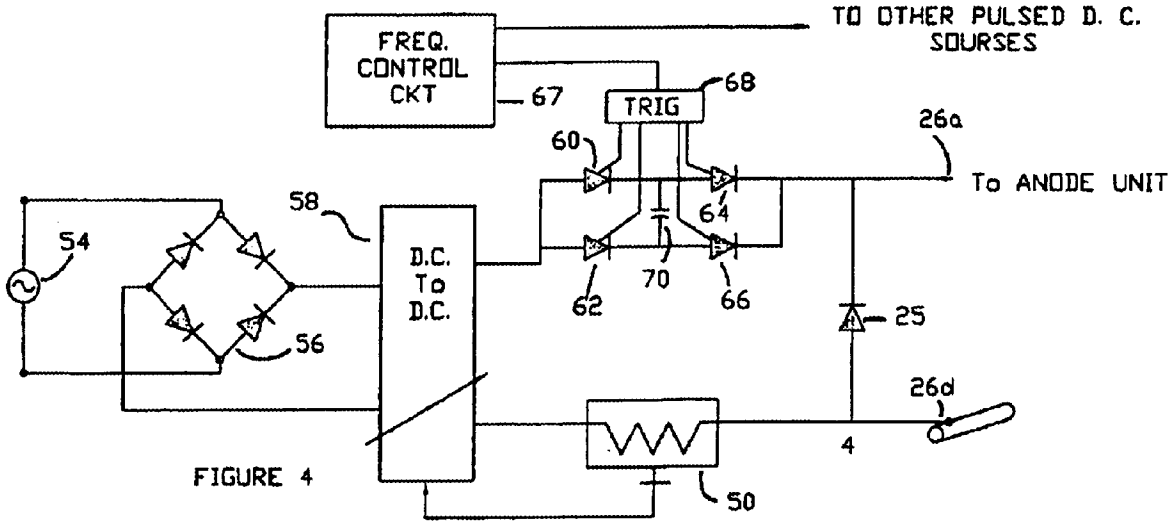
FIG. 4 is a circuit diagram, in block and schematic form, of a pulsed current source utilizing a D.C. to D.C. converter for controlling the current amplitude of the output pulse in accordance with the present invention.

An additional breakdown of the components for use in a pulsed D.C. source are shown in FIG. 4 wherein an A.C. source supplies current to D.C. to D.C. converter 58 via full wave bridge rectifier 56. The output of the D.C. to D.C. converter is applied to a group of silicon controlled rectifiers ("SCRs") 60, 62, 64 and 66 which are controlled from a frequency control circuit 67 via a conventional trigger circuit 68 to form, in conjunction with capacitor 70, a capacity charge/discharge circuit. The capacitor 70 is connected between the anode/cathode junctions of the SCRs as shown also functions to double the voltage from the converter 56. SCRs 60, 66 and 62, 64 are triggered to conduct alternately in a conventional manner, as is more fully explained in the '405 patent. The size (or value) of the capacitor 68 sets the pulse width of the output pulses supplied to the load. In this embodiment the control circuit 62 need only set the frequency and synchronize the outputs of the several D.C. pulse sources.

The D.C. to D.C. converter is provided with a feedback voltage from a current sensing resistor unit 50 to maintain the current output at an adjusted setting.

Figure 5:
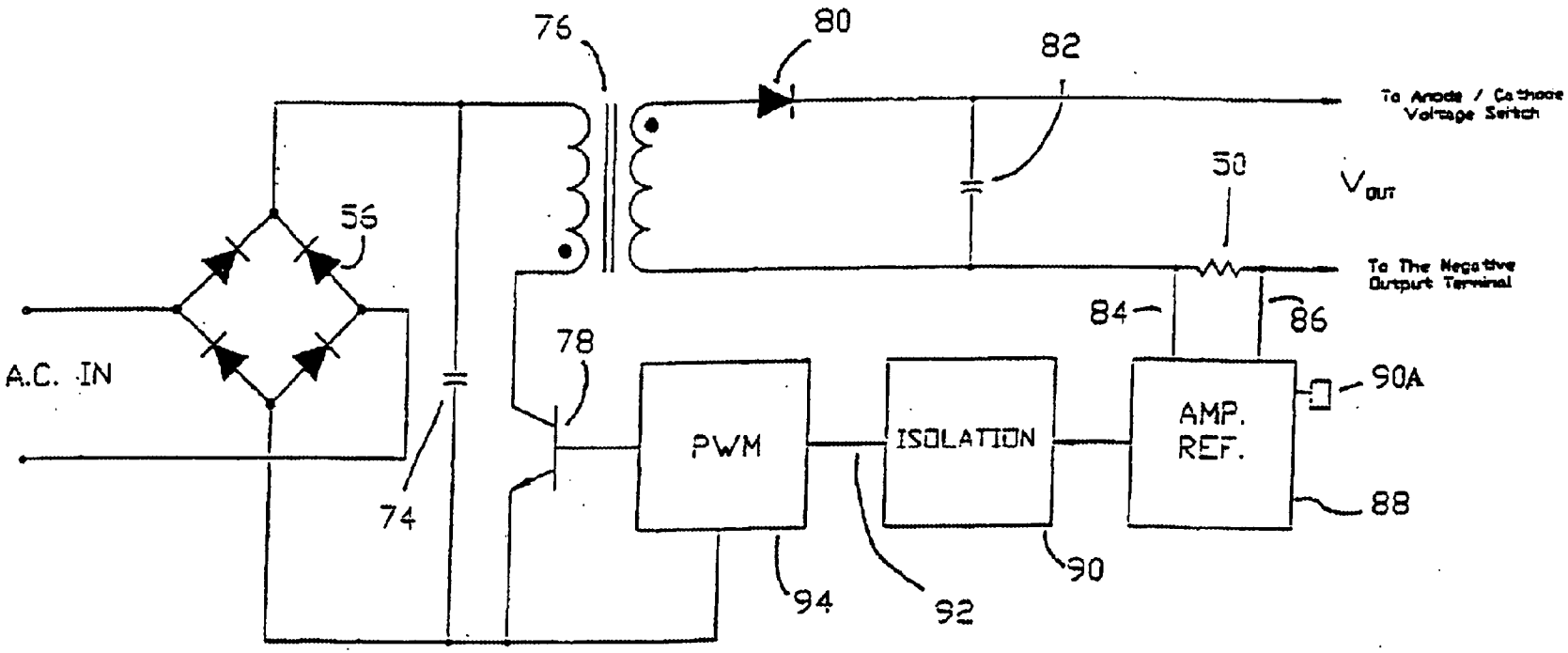
FIG. 5 is a schematic/block diagram of a D.C. to D. C. converter.

One type of D.C. to D.C. converter which may be employed is illustrated in FIG. 5 in which the rectified A.C. is filtered via capacitor 74 and applied to the primary winding of an isolation transformer 76 in series with the collector-emitter circuit of a switching power transistor such as an IGBT. The secondary winding of the transformer supplies the pulsed output current through an isolation diode 80 to an anode/cathode voltage switch and to the negative output terminal. A filter capacitor 82 is connected across the output terminals as shown.

The current sensing resistor unit 50, connected in series with the negative output terminal (or positive, if desired) supplies a feedback voltage via leads 84, 86 to an amplitude reference circuit 88. The amplitude of the reference signal in circuit 88 may be adjusted by knob 90A (like knob 26*a* of circuit 26) connected, for example, to a potentiometer in a conventional manner. The output signal on lead 88*a* from the amplitude reference circuit is representative of the difference between the amplitude of the reference signal and the voltage on leads 84, 86 which in turn is representative of the mean or average amplitude of the pulsed current output to the anode unit/well casing. The feedback signal on lead 92 is supplied to a pulse width modulator 94 via an isolator circuit 90. The pulse width modulator, which operates at a high frequency such as 20 to 200 Khz or more to provide accurate control of the amplitude of the output current, controls the base or gate electrode of the switching transistor 78. It should be noted that when used in the present application it is not necessary to include the isolation transformer 76 or diode 80.

It should be noted that if a D.C. to D.C. converter is used with a non-capacitance discharge anode/cathode switch such as a transistor, e.g., an Isolated Gate Bi polar transistor (IGBT), then the control circuit must set the pulse width as well as the frequency.

Figure 6:
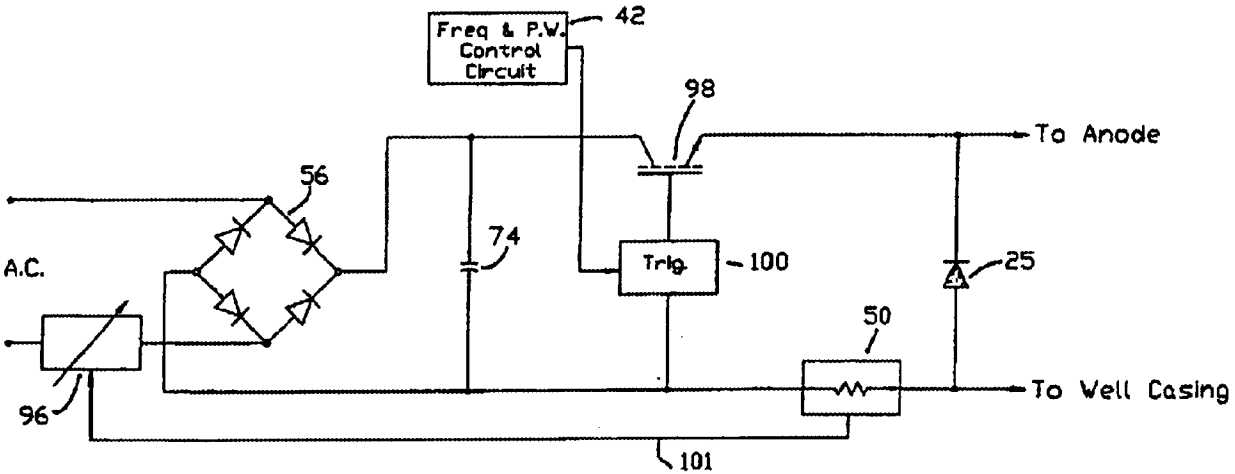
FIG. 6 is a circuit diagram partially in block and schematic form of another embodiment of a pulsed current source suitable for use in the invention.

Another example of a pulsed D.C. source is illustrated in FIG. 6 wherein an adjustable current amplitude current control circuit 96 is placed on the A.C. side of a pulsed D.C. source with a power switching transistor 98 such as an IGBT serving as the anode/cathode voltage switch. A trigger circuit 100 under the control of the frequency and pulse width control circuit 42 sets the frequency and pulse width of the output pulses. The current amplitude control circuit 96, which may utilize SCRs or Triacs in a well known manner to adjustably control the portion of each half cycle of the input sine wave supplied to the bridge rectifier, receives a feedback signal on lead 101. The feedback signal from the current sensing resistor unit 50 is representative of the load (anode/cathode) current. The control circuit 96, in response to the feedback signal maintains the value of the adjusted current output to the bridge rectifier substantially constant.

It should be noted that while an SCR or Triac type amplitude control circuit 96 will operate satisfactorily to control the magnitude of the current pulses to the load these circuits are inherently inefficient because of power losses in the SCRs or Triacs. In contrast, D.C. to D.C. converters are typically much more efficient due to the low resistance drop through the switching transistor.

There has thus been described a cathodic protection system and method for providing improved protection for multiple structures such as well casings or pipelines. While the invention has been described in connection with several embodiments, it is not intended that the scope of the invention be limited to such embodiments and examples discussed above. Various alternatives, modifications, and equivalents will become apparent to those skilled in the art without departing from the spirit and scope of the invention as defined by the appended claims.

What is claimed is:

1. In a system for effecting cathodic protection of a plurality of spaced electrically conducting structures, including metal pipe lines or well casings, exposed to an electrically conducting medium, including the ground, the medium being in contact with an anode structure and through which current may be passed to said medium and to the structures, the combination comprising:

a plurality of pulsed D.C. current sources, each source being adapted to be connected to a separate conducting structure for supplying a controllable current at a selected frequency pulse between the associated conducting structure and the anode; and a control circuit coupled to each of the current sources for synchronizing the operation of the current sources so that the current pulses from the plurality of current sources occupy substantially the same time frame during each cycle.

2. The cathodic protection system of claim 1 wherein each current source includes means for adjusting the magnitude of the current supplied therefrom.

3. The cathodic protection system of claim 2 wherein the control circuit adjusts the frequency of the current pulses supplied by the D.C. current sources *and wherein each current source includes an anode/cathode switch*.

4. The cathodic protection system of claim 3 wherein the control circuit sets the pulse width and frequency of the current pulses.

5. The cathodic protection system of claim 4 wherein the anode/cathode switch employs an isolated gate bipolar transistor to switch the D.C. source across the associated structure/anode load.

6. The cathodic protection system of claim 3 wherein the anode/cathode switch includes a plurality of silicon controlled rectifirers.

7. The cathodic protection system of claim 2 wherein each current source includes means for maintaining the current substantially constant once the magnitude thereof is set.

8. The cathodic protection system of claim 7 wherein the means for maintaining the current constant includes means for measuring the current output.

9. The cathodic protection system of claim 7 wherein each of the D.C. current sources includes a D.C. to D. C. converter.

10. The cathodic protection system of claim 7 wherein each of the D.C. current sources include a D.C. source for providing an adjustable current level output and an anode/cathode switch coupled to the control circuit for connecting the output of the D.C. current source to the associated structure and anode unit in accordance with the pulse width and frequency set by the control circuit.

11. A method of protecting a plurality of spaced electrically conducting structures, including well casings or pipelines, exposed to an electrically conducting medium including the ground, the medium being in contact with the structures comprising the steps of:

immersing an anode unit into the conducting medium;

connecting the negative output terminal of a separate pulsed D.C. source to each conducting structure with each source being adapted to provide pulsed D.C. output current at a selected frequency and pulse width;

connecting the positive terminal of each of the pulsed D.C. sources to the anode; and synchronizing the operation of the pulsed D.C. sources so that the current pulses from all of the D.C. sources occupy substantially the same time frame during each cycle.

12. The method of claim 11 further including the step of individually adjusting the magnitude of the current delivered by the plurality of pulsed D.C. current sources.

13. The method of claim 12 further including the step of measuring the well head potential of the plurality of structures during the current adjusting step.

14. The method of claim 11 further including the step of adjusting the frequency and/or the pulse width of the output current pulses.

*15. A cathodic protection system in which one or more pulsed dc current source protects one or more spaced electrically conducting structures including metal pipe lines or well casings embedded in the ground along with an anode structure comprising:*

*at least one pulsed dc current source, each dc current source having an input circuit and a pair of output terminals with one terminal adapted to be connected to an electrically conducting structure and the other terminal adopted to be connected to the anode structure, dc current source being arranged to produce across the output terminals periodic current pulses at a selected frequency and time frame within each cycle as determined by a control signal applied to its input circuit; and*

*a frequency control circuit having a plurality of output terminals and being arranged to produce a common controllable frequency output signal on each of the output terminals, one of the output terminals being connected to the input circuit of said at least one dc current source, the remaining output terminals being adapted to be connected to the input circuits of additional pulsed dc current sources.*

*16. The cathodic protection system of claim 15 wherein the frequency control circuit is arranged to produce substantially square wave output signals and wherein said at least one dc current source is arranged to produce current pulses which coincide with the control circuit output signals.*

*17. The cathodic protection system of claim 16 wherein said at least one dc current source includes an anode/cathode switch and wherein the anode/cathode switch employs an isolated gate bipolar transistor.*

*18. In a system adapted to affect cathodic protection of a plurality of spaced electrically conducting structures including metal pipe lines or well casings, exposed to an electrically conducting medium including the ground, the medium being in contact with an anode structure and through which current may be passed to said medium and to the structures the combination comprising:*

*one pulsed dc current source having a pair of output terminals and an input circuit, one of the output terminals being adapted to be connected to one of the conducting structures of the outer terminal being adapted to be connected to the anode, the dc source being responsive to the application of a control signal to the input circuit thereof for supplying current pulses at a selected frequency and time frame within each cycle between the associated conducting structure and the anode, and*

*a control circuit having a plurality of output terminals, one of the output terminals being connected to the input terminal of said dc source, the other output terminal being adapted to be connected to the input terminals of other dc sources.*

*19. In a system for affecting cathodic protection of a plurality of spaced electrically conducting structures, including metal pipe lines or well casings, exposed to an electrically conducting medium, including the ground, the medium being in contact with an anode structure and through which current may be passed to said medium and to the structures by a plurality of pulsed dc current sources with each source having an input terminal and a pair of output terminals adapted to be connected to a separate conducting structure and the anode, each dc current source supplying controlled current pulses at a selected frequency between the associated conducting structure and the anode in response to a signal on the input terminal thereof, the combination comprising:*

*one of said dc sources and a control circuit, the control circuit having a plurality of output terminals, one of the output terminals connected to the input terminal of said one dc source, the other output terminals being adapted to be connected to an input terminal of a separate dc source, the control circuit providing a common output signal on the output terminals for synchronizing the operation of a plurality of dc current sources so that the current pulses from the plurality of current sources occupy substantially the same time frame during each cycle.*

* * * * *